(12) United States Patent
Yanez

(10) Patent No.: US 11,212,494 B2
(45) Date of Patent: Dec. 28, 2021

(54) HOLOGRAPHIC CHRISTMAS TREE PROJECTOR ASSEMBLY

(71) Applicant: Ray Yanez, Houston, TX (US)

(72) Inventor: Ray Yanez, Houston, TX (US)

(*) Notice: Subject to any disclaimer, the term of this patent is extended or adjusted under 35 U.S.C. 154(b) by 34 days.

(21) Appl. No.: 16/730,624

(22) Filed: Dec. 30, 2019

(65) Prior Publication Data

US 2021/0203893 A1     Jul. 1, 2021

(51) Int. Cl.
```
G02B 30/00      (2020.01)
H04N 9/31       (2006.01)
G09F 19/18      (2006.01)
G09F 27/00      (2006.01)
H04R 1/02       (2006.01)
H04R 3/12       (2006.01)
G06F 3/16       (2006.01)
H04R 1/40       (2006.01)
```

(52) U.S. Cl.
CPC .......... *H04N 9/3147* (2013.01); *G06F 3/165* (2013.01); *G09F 19/18* (2013.01); *G09F 27/00* (2013.01); *H04R 1/028* (2013.01); *H04R 1/403* (2013.01); *H04R 3/12* (2013.01); *G09F 2027/002* (2013.01); *H04R 2499/15* (2013.01)

(58) Field of Classification Search
CPC .......... G03H 2001/0055; G03H 1/0891; F21Y 2105/18; G02B 30/00; G02B 30/40
See application file for complete search history.

(56) References Cited

U.S. PATENT DOCUMENTS

| | | | | |
|---|---|---|---|---|
| 3,949,350 | A * | 4/1976 | Smith | F21S 6/002 362/86 |
| 4,107,764 | A * | 8/1978 | Riley | F21S 10/007 362/35 |
| 4,809,584 | A * | 3/1989 | Forrest | A63J 17/00 340/815.46 |
| 4,858,079 | A * | 8/1989 | Ohashi | A63H 5/00 362/35 |
| 4,972,305 | A | 11/1990 | Blackburn | |
| 5,104,608 | A | 4/1992 | Pickering | |
| 5,189,531 | A * | 2/1993 | Palmer | A45D 33/18 132/293 |
| 5,191,319 | A * | 3/1993 | Kiltz | A63J 17/00 340/815.46 |
| 5,324,224 | A * | 6/1994 | Anderson | A63H 33/26 362/184 |
| 5,934,223 | A * | 8/1999 | Ellery-Guy | A01K 15/025 119/702 |
| D422,003 | S | 3/2000 | Takizawa | |
| 6,652,927 | B1 | 11/2003 | Chen | |
| 7,748,869 | B2 * | 7/2010 | Sevack | F21S 10/007 362/277 |
| 8,128,274 | B2 | 3/2012 | Chien | |
| 8,714,799 | B2 * | 5/2014 | Chien | F21V 23/04 362/555 |

(Continued)

FOREIGN PATENT DOCUMENTS

WO    WO2017015290    1/2017

*Primary Examiner* — Ismael Negron

(57) ABSTRACT

A holographic holiday display assembly includes a housing; a hologram unit coupled to the housing and configured to project a holographic Christmas tree above the housing; a plurality of speakers coupled to the housing to emit sound; a wireless remote control for turning each of the projector unit and the speakers on and off.

13 Claims, 5 Drawing Sheets

(56) References Cited

U.S. PATENT DOCUMENTS

| | | | |
|---|---|---|---|
| 9,423,770 B2 | 8/2016 | Yamaichi | |
| 10,713,006 B2* | 7/2020 | Takechi | G10L 15/26 |
| 10,755,612 B1* | 8/2020 | Bastiyali | G06Q 30/0264 |
| 2002/0154787 A1* | 10/2002 | Rice | H04R 29/008 |
| | | | 381/124 |
| 2004/0136039 A1* | 7/2004 | Odhner | G02B 5/1842 |
| | | | 359/15 |
| 2005/0068595 A1* | 3/2005 | Fitzgerald | G03H 1/22 |
| | | | 359/15 |
| 2006/0026875 A1 | 2/2006 | Elffers | |
| 2006/0279815 A1 | 12/2006 | Rathus | |
| 2012/0188451 A1 | 7/2012 | Schmidt | |
| 2015/0116454 A1* | 4/2015 | Kim | H04N 5/23216 |
| | | | 348/40 |
| 2016/0007430 A1* | 1/2016 | Kidakarn | H05B 47/19 |
| | | | 315/185 S |
| 2017/0023911 A1 | 1/2017 | Russell | |

\* cited by examiner

HOLOGRAPHIC CHRISTMAS TREE PROJECTOR ASSEMBLY

CROSS-REFERENCE TO RELATED APPLICATIONS

Not Applicable

STATEMENT REGARDING FEDERALLY SPONSORED RESEARCH OR DEVELOPMENT

Not Applicable

THE NAMES OF THE PARTIES TO A JOINT RESEARCH AGREEMENT

Not Applicable

INCORPORATION-BY-REFERENCE OF MATERIAL SUBMITTED ON A COMPACT DISC OR AS A TEXT FILE VIA THE OFFICE ELECTRONIC FILING SYSTEM

Not Applicable

STATEMENT REGARDING PRIOR DISCLOSURES BY THE INVENTOR OR JOINT INVENTOR

Not Applicable

BACKGROUND OF THE INVENTION

(1) Field of the Invention

The disclosure relates to holographic display devices and more particularly pertains to a new holographic display device for celebrating Christmas without a Christmas tree.

(2) Description of Related Art Including Information Disclosed Under 37 CFR 1.97 and 1.98

The prior art relates to holographic display devices. The prior art discloses a variety of hologram projectors that include a central hologram projection unit and a plurality of remote projection units that, in conjunction with each other, produce a holographic image. Additionally, the prior art discloses a variety of synthetic Christmas tree displays that are each constructed of tangible materials. The prior art discloses a variety of holographic projectors that each renders a simulated holographic image onto a reflective surface.

BRIEF SUMMARY OF THE INVENTION

An embodiment of the disclosure meets the needs presented above by generally comprising a housing and a hologram unit that is coupled to the housing. The hologram unit projects a holographic Christmas tree above the housing when the hologram unit is turned on. In this way the hologram unit is facilitates a user to celebrate Christmas without a Christmas tree. A plurality of speakers is each of the speakers is coupled to the housing to emit sound outwardly therefrom. A remote control is provided that is in wireless communication with the projector unit and the speakers. The remote control remotely turns each of the projector unit and the speakers on and off.

There has thus been outlined, rather broadly, the more important features of the disclosure in order that the detailed description thereof that follows may be better understood, and in order that the present contribution to the art may be better appreciated. There are additional features of the disclosure that will be described hereinafter and which will form the subject matter of the claims appended hereto.

The objects of the disclosure, along with the various features of novelty which characterize the disclosure, are pointed out with particularity in the claims annexed to and forming a part of this disclosure.

BRIEF DESCRIPTION OF SEVERAL VIEWS OF THE DRAWING(S)

The disclosure will be better understood and objects other than those set forth above will become apparent when consideration is given to the following detailed description thereof. Such description makes reference to the annexed drawings wherein.

DETAILED DESCRIPTION OF THE INVENTION

Figure 1:
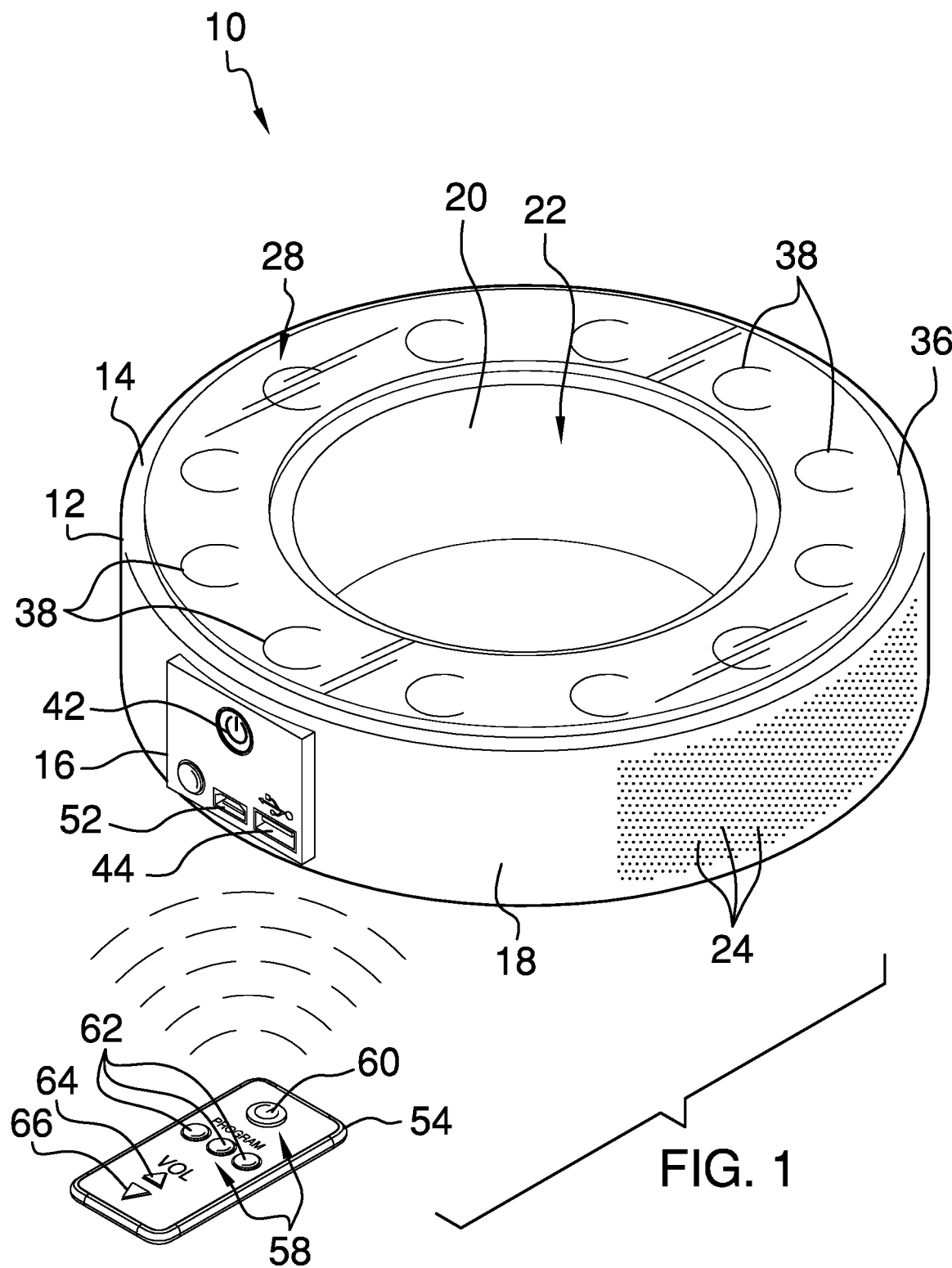
FIG. 1 is a top perspective view of a holographic holiday display assembly according to an embodiment of the disclosure.
Figure 2:
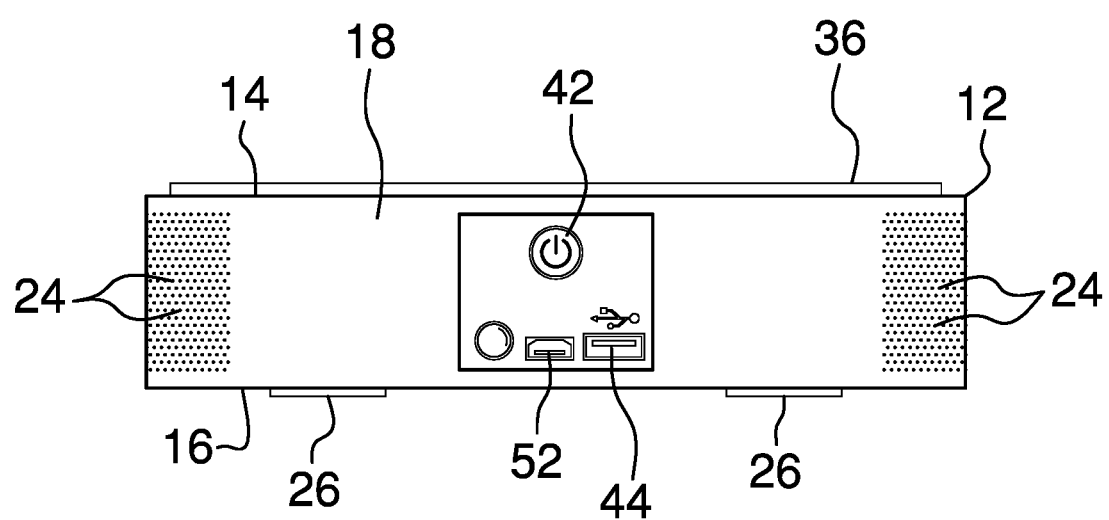
FIG. 2 is a front view of an embodiment of the disclosure.
Figure 3:
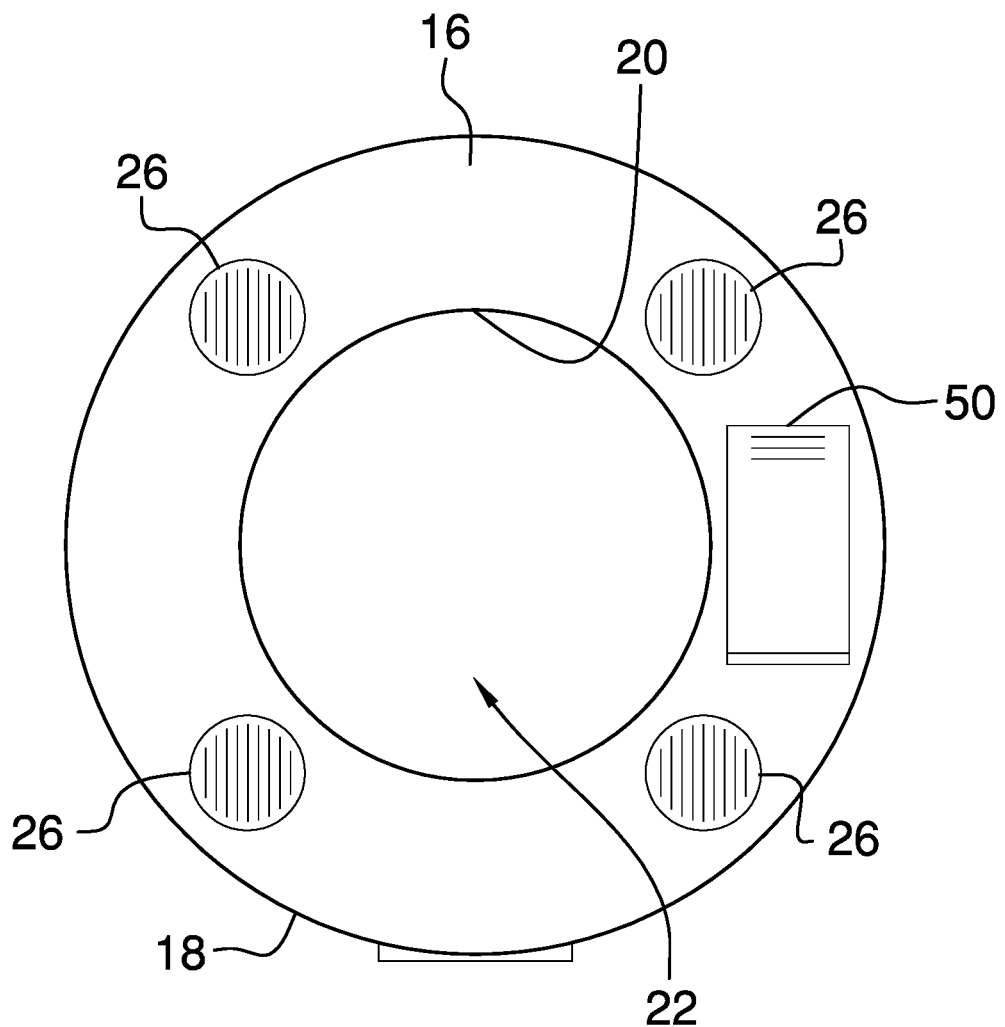
FIG. 3 is a bottom view of an embodiment of the disclosure.
Figure 4:
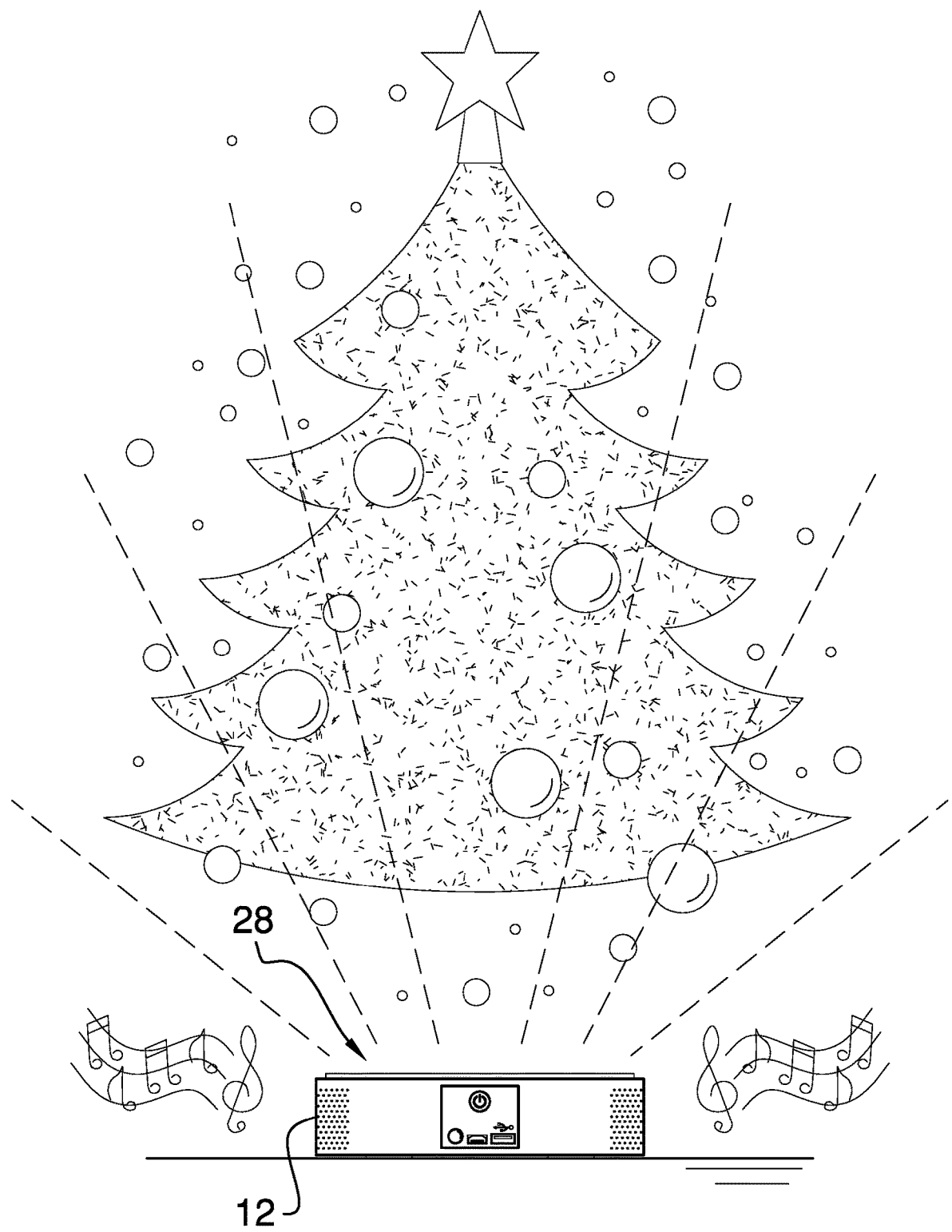
FIG. 4 is a perspective in-use view of an embodiment of the disclosure.
Figure 5:
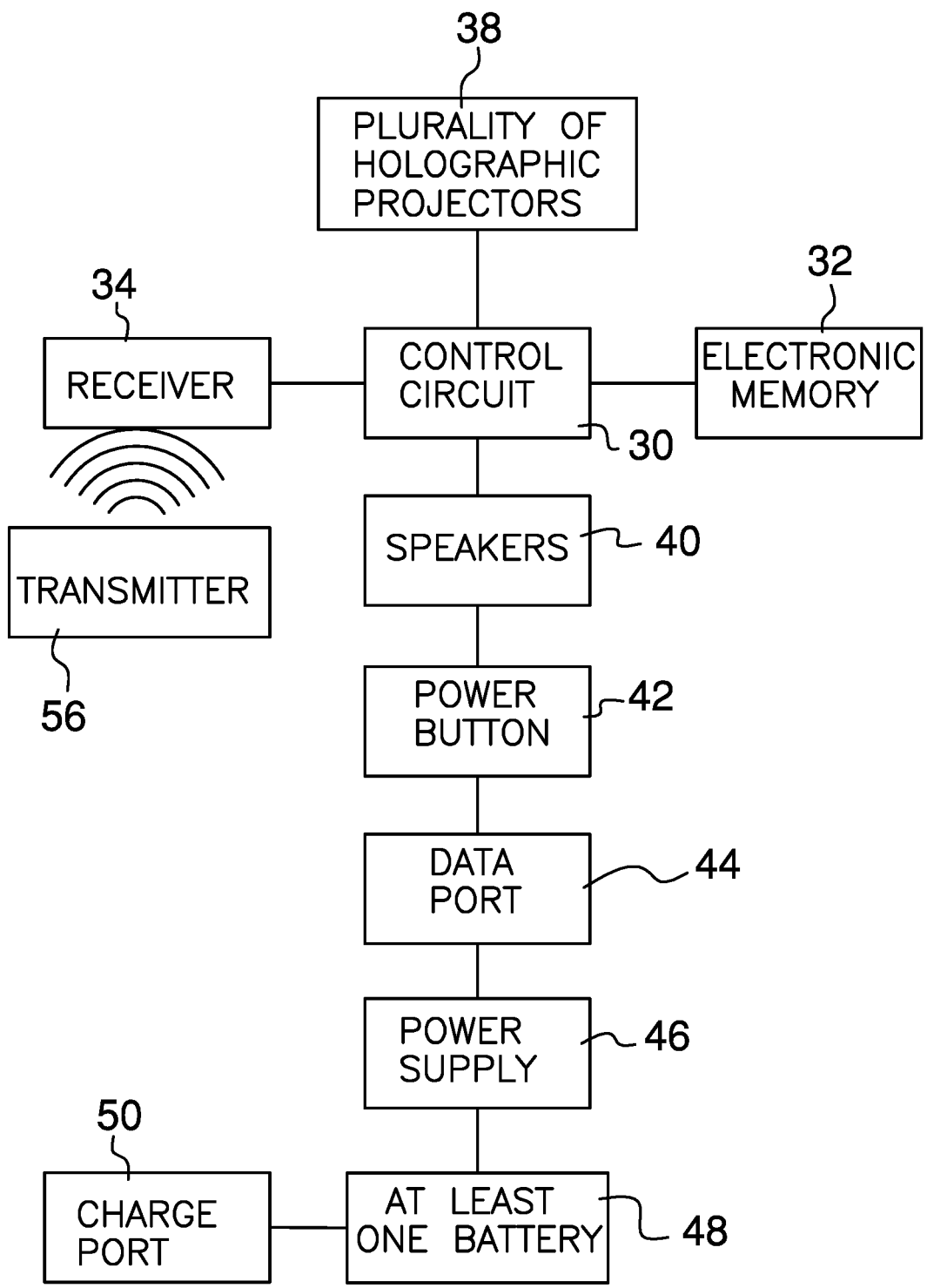
FIG. 5 is a schematic view of an embodiment of the disclosure.

With reference now to the drawings, and in particular to FIGS. 1 through 5 thereof, a new holographic display device embodying the principles and concepts of an embodiment of the disclosure and generally designated by the reference numeral 10 will be described.

As best illustrated in FIGS. 1 through 5, the holographic holiday display assembly 10 generally comprises a housing 12 that is continuously arcuate about a center point such that the housing 12 defines a ring. The housing 12 has a top wall 14, a bottom wall 16, an outwardly facing wall 18 and an inwardly facing wall 20. The inwardly facing wall 20 is continuously arcuate about the center point such that the inwardly facing wall 20 defines an opening 22 extending through the housing 12. Additionally, the outwardly facing wall 18 is co-arcuate with the inwardly facing wall 20 such that each of the inwardly facing wall 20 and the outwardly facing wall 18 define concentric circles. The top wall 14 is open into an interior of the housing 12 and the outwardly facing wall 18 has a plurality of speaker openings 24 extending therethrough for passing sound out of the housing 12. A plurality of feet 26 is each coupled to the bottom wall 16 of the housing 12 for supporting the housing 12 on a support surface, such as a floor or the like.

A hologram unit 28 is provided and the hologram unit 28 is coupled to the housing 12. The hologram unit 28 projects a holographic Christmas tree above the housing 12 when the hologram unit 28 is turned on. In this way a user can celebrate Christmas without a Christmas tree. The hologram unit 28 comprises a control circuit 30 that is positioned in the housing 12 and an electronic memory 32 that is positioned in the housing 12. The electronic memory 32 is electronically coupled to the control circuit 30. The electronic memory 32 stores an imagery database comprising a plurality of images of Christmas trees each having differing ornaments. Additionally, the electronic memory 32 stores an audio database comprising a variety of Christmas music. A receiver 34 is positioned in the housing 12 and the receiver 34 is electrically coupled to the control circuit 30. The receiver 34 may comprise a radio frequency receiver or the like.

A lens 36 is coupled to the top wall 14 and the lens 36 extends around the entire curvature of the top wall 14. Additionally, the lens 36 is comprised of a translucent material. The lens 36 may be a holographic lens that is commonly employed with holographic projections. The hologram unit 28 includes a plurality of projectors 38 that is each coupled to the housing 12. Each of the projectors 38 is electrically coupled to the control circuit 30 and each of the projectors 38 is positioned beneath the lens 36. Additionally, the projectors 38 are spaced apart from each other and are distributed around a full perimeter of the housing 12. Each of projectors 38 projects a holographic image upwardly through the lens 36 when the projectors 38 are turned on. Each of the projectors 38 may comprise a digital hologram projector that is capable of projecting a three dimensional image.

A plurality of speakers 40 is included and each of the speakers 40 is coupled to the housing 12 to emit sound outwardly therefrom. Each of the speakers 40 is electrically coupled to the control circuit 30 such that the speakers 40 receive the Christmas music from the electronic memory 32. Additionally, each of the speakers 40 is aligned with the speaker openings 24 in the outwardly facing wall 18 of the housing 12. Each of the speakers 40 may comprise an electronic speaker of any conventional design.

A power button 42 is provided and the power button 42 is movably coupled to outwardly facing wall 18 of the housing 12. The power button 42 is electrically coupled to the control circuit 30 and the power button 42 turns the control circuit 30 on and off. A data port 44 is recessed into the outwardly facing surface of the housing 12, the data port 44 is electrically coupled to the control circuit 30 and the data port 44 is pluggable into a data source for downloading data into the electronic memory 32. The data port 44 may comprise a usb port or other similar type of electronic data port 44.

A power supply 46 is coupled to the housing 12 and the power supply 46 is electrically coupled to the control circuit 30. The power supply 46 comprises at least one battery 48 that is removably positioned in the housing 12. The at least one battery 48 is electrically coupled to the control circuit 30. A battery cover 50 is removably coupled to the bottom wall 16 of the housing 12 and the at least one battery 48 is positioned behind the battery cover 50. A charge port 52 is recessed into the outwardly facing wall 18 of the housing 12, the charge port 52 is electrically coupled to the at least one battery 48 and the charge port 52 is pluggable into a power source for charging the at least one battery 48.

A remote control 54 is in wireless communication with the hologram unit 28 and the speakers 40. The remote control 54 remotely turns each of the hologram unit 28 and the speakers 40 on and off. The remote control 54 includes a transmitter 56 that is positioned in the remote control 54 and the transmitter 56 is in electrical communication with the receiver 34 in the projection unit. The transmitter 56 may comprise a radio frequency transmitter 56 or the like.

A plurality of control buttons 58 is each movably positioned on the remote control 54. Each of the control buttons 58 is electrically coupled to the transmitter 56. The plurality of control buttons 58 at least includes a power button 60, a plurality of program buttons 62, a volume up button 64 and a volume down button 66. The power button 60 turns the hologram unit 28 on and off. Each of the program buttons 62 is associated with respective imagery stored in the electronic memory 32 for displaying the selected imagery. The volume up button 64 increases the intensity of the speakers 40 and the volume down button 66 decreases the intensity of the speakers 40.

In use, the housing 12 is positioned in a location that the user wishes to display a Christmas tree. The hologram unit 28 is turned on to project one of the selected images of the Christmas trees extending upwardly from the housing 12. In this way the user can celebrate Christmas without the use of a real Christmas tree or a synthetic Christmas tree. Additionally, the speakers 40 play music to enhance the overall experience for the user.

With respect to the above description then, it is to be realized that the optimum dimensional relationships for the parts of an embodiment enabled by the disclosure, to include variations in size, materials, shape, form, function and manner of operation, assembly and use, are deemed readily apparent and obvious to one skilled in the art, and all equivalent relationships to those illustrated in the drawings and described in the specification are intended to be encompassed by an embodiment of the disclosure.

Therefore, the foregoing is considered as illustrative only of the principles of the disclosure. Further, since numerous modifications and changes will readily occur to those skilled in the art, it is not desired to limit the disclosure to the exact construction and operation shown and described, and accordingly, all suitable modifications and equivalents may be resorted to, falling within the scope of the disclosure. In this patent document, the word "comprising" is used in its non-limiting sense to mean that items following the word are included, but items not specifically mentioned are not excluded. A reference to an element by the indefinite article "a" does not exclude the possibility that more than one of the element is present, unless the context clearly requires that there be only one of the elements.

I claim:

1. A holographic holiday display assembly being configured to produce a hologram of a Christmas tree, said assembly comprising:

a housing being continuously arcuate about a center point such that said housing defines a continuous and unbroken ring, wherein said housing has a top wall, a bottom wall, an outwardly facing wall and an inwardly facing wall, said inwardly facing wall being unbroken and continuously arcuate about said center point such that said inwardly facing wall defines an opening extending through said housing, said outwardly facing wall being co-arcuate with said inwardly facing wall such that each of said inwardly facing wall and said outwardly facing wall define concentric circles, said top wall being open into an interior of said housing; said outwardly facing wall having a plurality of speaker openings extending therethrough for passing sound out of said housing;

a hologram unit being coupled to said housing, said hologram unit projecting a holographic image of a Christmas tree above said housing when said hologram unit is turned on;

a plurality of speakers, each of said speakers being coupled to said housing wherein each of said speakers is configured to emit sound outwardly therefrom; and a remote control being in wireless communication with said hologram unit and said speakers, said remote control remotely turning said hologram unit and each of said speakers on and off.

2. The assembly according to claim 1, wherein said hologram unit comprises:
   a control circuit being positioned in said housing; and
   an electronic memory being positioned in said housing, said electronic memory being electronically coupled to said control circuit, said electronic memory storing an imagery database comprising a plurality of images of Christmas trees each having differing ornaments, said electronic memory storing an audio database comprising a variety of Christmas music.

3. The assembly according to claim 2, wherein each of said speakers is electrically coupled to said control circuit such that said speakers receive the Christmas music from said electronic memory, each of said speakers being aligned with said speakers openings in said outwardly facing wall of said housing.

4. The assembly according to claim 2, wherein said hologram unit includes a receiver being positioned in said housing, said receiver being electrically coupled to said control circuit.

5. The assembly according to claim 4, wherein said hologram unit includes a lens being coupled to said top wall, said lens extending around the entire curvature of said top wall, said lens being comprised of a translucent material.

6. The assembly according to claim 5, wherein said hologram unit includes a plurality of projectors, each of said projectors being coupled to said housing, each of said projectors being electrically coupled to said control circuit, each of said projectors being positioned beneath said lens, said projectors being spaced apart from each other and being distributed around a full perimeter of said housing, each of projectors projecting a holographic image upwardly through said lens when said projectors are turned on.

7. The assembly according to claim 2, further comprising a power button being movably coupled to outwardly facing wall of said housing, said power button being electrically coupled to said control circuit, said power button turning said control circuit on and off.

8. The assembly according to claim 7, further comprising a data port being recessed into said outwardly facing surface of said housing, said data port being electrically coupled to said control circuit, said data port being pluggable into a data source for downloading data into said electronic: memory.

9. The assembly according to claim 8, further comprising a power supply being coupled to said housing, said power supply being electrically coupled to said control circuit, said power supply comprising:
   at least one battery being removably positioned in said housing, said at least one battery being electrically coupled to said control circuit; and
   a charge port being recessed into said outwardly facing wall of said housing, said charge port being electrically coupled to said at least one battery, said charge port being pluggable into a power source for charging said at least one battery.

10. The assembly according to claim 2, wherein said remote control includes a transmitter being positioned in said remote control, said transmitter being in electrical communication with said receiver in said projection unit.

11. The assembly according to claim 10, wherein said remote control includes a plurality of control buttons, each of said control buttons being movably positioned on said remote control, each of said control buttons being electrically coupled to said transmitter.

12. The assembly according to claim 11, wherein said plurality of control buttons at least includes a power button, a plurality of program buttons, a volume up button and a volume down button, said power button turning said projector unit on and off, each of said program buttons being associated with respective imagery stored in said electronic memory for displaying the selected imagery, said volume up button increasing the intensity of said speakers, said volume down button decreasing the intensity of said speakers.

13. A holographic holiday display assembly being configured to produce a hologram of a Christmas tree, said assembly comprising:
   a housing being continuously arcuate about a center point such that said housing defines a continuous and unbroken ring, said housing having a top wall, a bottom wall, an outwardly facing wall and an inwardly facing wall, said inwardly facing wall being unbroken and continuously arcuate about said center point such that said inwardly facing wall defines an opening extending through said housing, said outwardly facing wall being co-arcuate with said inwardly facing wall such that each of said inwardly, facing wall and said outwardly facing wall define concentric circles, said top wall being open into an interior of said housing, said outwardly facing wall having a plurality of speaker openings extending therethrough for passing sound out of said housing;
   a hologram unit being coupled to said housing, said hologram unit projecting a holographic image of a Christmas tree above said housing when said hologram unit is turned on, said hologram unit comprising:
      a control circuit being positioned in said housing;
      an electronic memory being positioned in said housing, said electronic memory being electronically coupled to said control circuit, said electronic memory storing an imagery database comprising a plurality of images of Christmas trees each having differing ornaments, said electronic memory storing an audio database comprising a variety of Christmas music;
      a receiver being positioned in said housing, said receiver being electrically coupled to said control circuit;
      a lens being coupled to said top wall, said lens extending around the entire curvature of said top wall, said lens being comprised of a translucent material; and
      a plurality of projectors, each of said projectors being coupled to said housing, each of said projectors being electrically coupled to said control circuit, each of said projectors being positioned beneath said lens, said projectors being spaced apart from each other and being distributed around a full perimeter of said housing, each of projectors projecting a holographic image upwardly through said lens when said projectors are turned on;
   a plurality of speakers, each of said speakers being coupled to said housing wherein each of said speakers is configured to emit sound outwardly therefrom, each of said speakers being electrically coupled to said control circuit such that said speakers receive the Christmas music from said electronic memory, each of said speakers being aligned with said speakers openings in said outwardly facing wall of said housing;
   a power button being movably coupled to said outwardly facing wall of said housing, said power button being electrically coupled to said control circuit, said power button turning said control circuit on and off;
a data port being recessed into said outwardly facing surface of said housing, said data port being electrically coupled to said control circuit, said data port being pluggable into a data source for downloading data into said electronic memory;
a power supply being coupled to said housing, said power supply being electrically coupled to said control circuit, said power supply comprising:
  at least one battery being removably positioned in said housing, said at least one battery being electrically coupled to said control circuit; and
  a charge port being recessed into said outwardly facing wall of said housing, said charge port being electrically coupled to said at least one battery, said charge port being pluggable into a power source for charging said at least one battery; and
a remote control being in wireless communication with said hologram unit and said speakers, said remote control remotely turning said hologram unit and each of said speakers on and off, said remote control including:
a transmitter being positioned in said remote control, said transmitter being in electrical communication with said receiver in said hologram unit; and
a plurality of control buttons, each of said control buttons being movably positioned on said remote control, each of said control buttons being electrically coupled to said transmitter, said plurality of control buttons at least including a power button, a plurality of program buttons, a volume up button and a volume down button, said power button turning said hologram unit on and off, each of said program buttons being associated with respective imagery stored in said electronic memory for displaying the selected imagery, said volume up button increasing the intensity of said speakers, said volume down button decreasing the intensity of said speakers.

* * * * *